US012562177B2

(12) United States Patent
Tseng et al.

(10) Patent No.: US 12,562,177 B2
(45) Date of Patent: Feb. 24, 2026

(54) CONFERENCE ROOM SYSTEM AND AUDIO PROCESSING METHOD

(71) Applicant: AmTRAN Technology Co., Ltd., New Taipei City (TW)

(72) Inventors: Chiung Wen Tseng, New Taipei City (TW); Yu Ruei Li, New Taipei City (TW); I Jui Yu, Taoyuan City (TW)

(73) Assignee: AmTRAN Technology Co., Ltd., New Taipei City (TW)

( * ) Notice: Subject to any disclaimer, the term of this patent is extended or adjusted under 35 U.S.C. 154(b) by 139 days.

(21) Appl. No.: 17/573,651

(22) Filed: Jan. 12, 2022

(65) Prior Publication Data

US 2022/0375486 A1 Nov. 24, 2022

(30) Foreign Application Priority Data

May 21, 2021 (TW) ................................ 110118562

(51) Int. Cl.
*G10L 21/0232* (2013.01)
*G10L 21/0216* (2013.01)
*G10L 21/04* (2013.01)

(52) U.S. Cl.
CPC .......... *G10L 21/0232* (2013.01); *G10L 21/04* (2013.01); *G10L 2021/02165* (2013.01)

(58) Field of Classification Search
CPC ...... G10L 21/0232; G10L 2021/02165; H04R 3/04
See application file for complete search history.

(56) References Cited

U.S. PATENT DOCUMENTS

| | | | | |
|---|---|---|---|---|
| 5,778,082 A * | 7/1998 | Chu | H04S 1/007 | 348/E7.083 |
| 8,130,978 B2 * | 3/2012 | Sun | H04N 7/15 | 381/59 |
| 2007/0021958 A1 * | 1/2007 | Visser | G10L 25/78 | 704/226 |
| 2007/0160230 A1 * | 7/2007 | Nakagomi | H04R 3/005 | 381/102 |
| 2009/0111507 A1 | 4/2009 | Chen | | |

(Continued)

FOREIGN PATENT DOCUMENTS

CN 109637550 A 4/2019

OTHER PUBLICATIONS

Rubio, Juan E., et al. "Two-microphone voice activity detection based on the homogeneity of the direction of arrival estimates." 2007 IEEE International Conference on Acoustics, Speech and Signal Processing—ICASSP'07. vol. 4. IEEE (Year: 2007).*

(Continued)

*Primary Examiner* — Bhavesh M Mehta
*Assistant Examiner* — Nandini Subramani
(74) *Attorney, Agent, or Firm* — CKC & Partners Co., LLC

(57) ABSTRACT

An audio processing method includes the following steps of capturing audio data by a microphone array to compute frequency array data of the audio data; computing a power sequence of degrees by using the frequency array data; and computing a difference value between a maximum value of the power sequence of degrees and a minimum value of the power sequence of degrees to determine whether the degree corresponding to the maximum value is a source degree relative to the microphone array.

14 Claims, 2 Drawing Sheets

(56) References Cited

U.S. PATENT DOCUMENTS

| | | | | |
|---|---|---|---|---|
| 2014/0241549 | A1* | 8/2014 | Stachurski | H04M 3/568 381/92 |
| 2016/0071526 | A1* | 3/2016 | Wingate | G01S 3/807 704/233 |
| 2019/0219660 | A1* | 7/2019 | Cordourier Maruri | G01S 3/8034 |
| 2019/0281162 | A1 | 9/2019 | Liang | |
| 2019/0342688 | A1 | 11/2019 | Sun et al. | |
| 2019/0385635 | A1* | 12/2019 | Shahen Tov | G10L 25/21 |
| 2020/0133625 | A1* | 4/2020 | Sharma | G10L 19/018 |
| 2022/0046355 | A1* | 2/2022 | Zamora Esquivel | H04R 3/005 |
| 2022/0301575 | A1* | 9/2022 | Yasuda | G10L 25/18 |

OTHER PUBLICATIONS

Nguyen, D., Aarabi, P., & Sheikholeslami, A. (2003, July). Real-time sound localization using field-programmable gate arrays. In 2003 International Conference on Multimedia and Expo. ICME'03. Proceedings (Cat. No. 03TH8698) (vol. 2, pp. II-829). IEEE (Year: 2003).*

Garrido, M. A Survey on Pipelined FFT Hardware Architectures. J. Signal Process. Syst. 2022, 94, 1345-1364 (Year: 2022).*

Juan E. Rubio et al., "Two-Microphone Voice Activity Detection Based on the Homogeneity of the Direction of Arrival Estimates", 2007 IEEE International Conference on Acoustics, Speech and Signal. Processing, 2007, pp. 385-388.

* cited by examiner

CONFERENCE ROOM SYSTEM AND AUDIO PROCESSING METHOD

CROSS-REFERENCE TO RELATED APPLICATION

This application claims priority to Taiwan Application Serial Number 110118562, filed May 21, 2021, which is herein incorporated by reference in its entirety.

BACKGROUND

Field of Invention

The present invention relates to an electronic operating system and method. More particularly, the present invention relates to a conference room system and audio processing method.

Description of Related Art

With the evolution of society, the use of video conferencing systems has become more and more popular. The video conferencing system is not only limited to connecting several electronic devices to perform functions, but should have a humanized design and keep pace with the times. Regarding one of the issues, if the video conferencing system has the function of quickly and accurately identifying the location of the caller, it can provide better service quality.

However, the existing azimuth estimation methods cannot provide a fast and stable azimuth degree determination. For ordinary knowledgeable persons, how to provide more accurate azimuth degree estimation is an urgent technical problem to be solved.

SUMMARY

The invention provides an audio processing method comprises the following steps of capturing audio data by a microphone array to compute frequency array data of the audio data; computing a power sequence of degrees by using the frequency array data; and computing a difference value between a maximum value of the power sequence of degrees and a minimum value of the power sequence of degrees to determine whether the degree corresponding to the maximum value is a source degree relative to the microphone array.

According to another embodiment, a conference room system is disclosed, which comprises a microphone array and a processor. A microphone array configured to capture an audio data. A processor, electrically coupled to the microphone array, and configured to: compute a frequency array data of the audio data; compute a power sequence of degrees by using the frequency array data; and compute a difference value between a maximum value of the power sequence of degrees and a minimum value of the power sequence of degrees to determine whether the degree corresponding to the maximum value is a source degree relative to the microphone array.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

Figure 1:
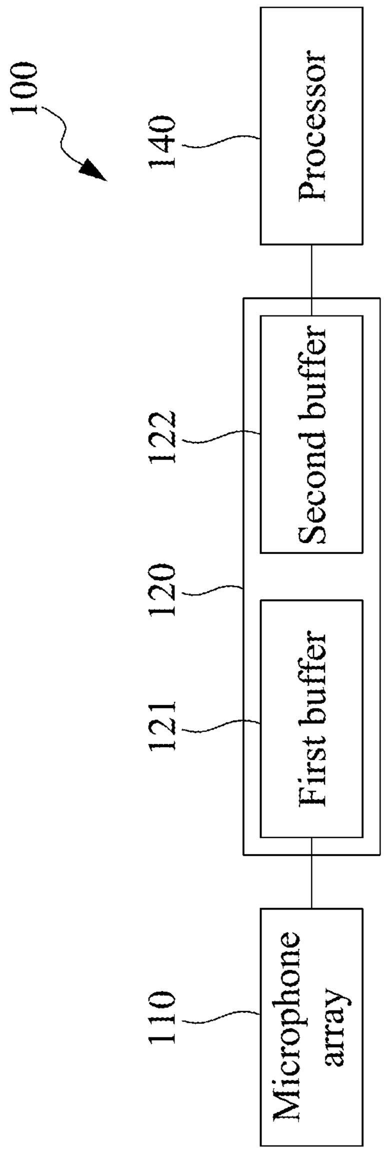
FIG. 1 shows a block diagram of a conference room system according to some embodiments of this invention.

It should be noted that, in accordance with the practical requirements of the description, the features in the diagram are not necessarily drawn to scale. In fact, for the purpose of clarity of discussion, the size of each feature may be increased or decreased arbitrarily.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Please refer to FIG. 1, which illustrates a block diagram of a conference room system 100 according to some embodiments of this invention. The conference room system 100 includes a microphone array 110, a buffer 120, and a processor 140. The microphone array 110 is electrically coupled to the buffer 120. The buffer 120 is electrically coupled to the processor 140. In some embodiments, the buffer 120 includes a first buffer 121 (or called a ring buffer) and a second buffer 122 (or called a moving window buffer). The first buffer 121 is electrically coupled to the second buffer 122. As shown in FIG. 1, the first buffer 121 is electrically coupled to the microphone array 110. The second buffer 122 is electrically coupled to the processor 140.

In some embodiments, the microphone array 110 is configured to capture audio data. For example, the microphone array 110 includes a plurality of microphones, which are continuously activated to capture any audio data, so that the audio data is stored in the first buffer 121. In some embodiments, the audio data captured by the microphone array 110 is stored in the first buffer 121 at a sample rate. For example, the sampling rate may be 48 kHz, that is, the analog audio signal is sampled 48,000 times per second, so that the audio data is stored in the first buffer 121 in a discrete data type.

In some embodiments, the conference room system 100 can detect the source degree of the current sound in real time. For example, the microphone array 110 is set on a conference table in a conference room. The conference room system 100 can determine whether the sound source is located at a degree or a degree range relative to the microphone array 110 in a degree of 360° through the audio data received by the microphone array 110. The detailed computation method of the degree of the sound source is explained as follows.

In some embodiments, the processor 140 computes the frequency array data of the audio data. For example, the sampling rate of the audio data stored in the first buffer 121 is 48 kHz, that is, there are 48,000 sampling data per second. In order to explain the computation of sampling data in the embodiment, the embodiment uses 1024 sampling data as 1 frame of data, that is, the time of 1 frame is about 21.3 (1024/48000) milliseconds.

In some embodiments, the microphone array 110 continuously generates audio data, and after sampling at a sampling rate of 48 kHz, stores a plurality of frames in the first buffer 121. The size of the space of the first buffer 121 can be a buffer space of 2 seconds, which can be designed or adjusted according to actual requirements, and the present case is not limited to this.

In some embodiments, the processor 140 reads a data number (for example, 1 frame) of audio data from the first buffer 121 as the input of a Fast Fourier Transform (FFT) operation. In some embodiments, in the initial situation when the first buffer 121 has not stored any audio data, the processor 140 continuously detects whether the number of stored data in the first buffer 121 reaches an operable number of data, that is, 1 frame of data. The processor 140 reads the audio data of each frame in the first buffer 121 to compute the fast Fourier transform, and stores the computed result in the second buffer 122.

In some embodiments, the processor 140 computes the frequency array data based on a Fourier length (FFT length) and a window shift (FFT shift) among the audio data of one frame. The Fourier length can be 1024 samples, and the window shift can be 512 samples. It is worth mentioning that the size of the window shift affects the number of frames subsequently used to compute the degree of arrival (DOA). For example, when the window shift is 512 samples of data, after 0.75 seconds of audio data is input to the fast Fourier transform operation, about 70 frames (0.75 seconds*48000/512) of frequency array data can be obtained. When the window shift is 1024 samples of data, after 0.75 seconds of audio data input to the fast Fourier transform operation, about 35 frames (0.75 seconds*48000/1024) of frequency array data can be obtained. In other words, the size of the window shift affects the accuracy of the subsequent computation of the degree of arrival. For example, when the window shift is 512, more frames, which can be used to compute the degree of arrival, can be obtained from the same audio data. Therefore, the processor 140 can compute the frequency array data of the audio data in real time based on the newly arrived audio data every frame.

In some embodiments, the processor 140 pre-stores a look-up table, and the look-up table records the degree of the fast Fourier transform and the value of the corresponding sine function. In each fast Fourier transform operation, the processor 140 can directly obtain the value through the look-up table without actually performing the fast Fourier transform operation. In this way, the computing speed of the processor 140 can be increased.

In each fast Fourier transform operation, the processor 140 can directly obtain the sine and cosine values by looking up the pre-established trigonometric function table, without recomputing the trigonometric function value, thus speeding up the fast Fourier operation.

In some embodiments, the second buffer 122 includes a storage space, such as a temporary storage space that can store 0.75 seconds of audio data. After the processor 140 computes the frequency array data of each frame from the audio data in the first buffer 121, the processor 140 stores the frequency array data in the second buffer 122. The frequency array data stored in the second buffer 122 includes the frequency intensity of the audio data at each frequency. For example, the second buffer 122 stores the intensity distribution of each frequency for 0.75 seconds.

In some embodiments, the processor 122 only needs to read 0.75 seconds of audio data from the first buffer 121 in the initial state (for example, the second buffer 122 does not store any frequency array data) and compute the frequency array data, so that the second buffer 122 stores the frequency array data for 0.75 seconds. After that, the processor 122 obtains the newly arrived audio data every 1 frame from the first buffer 121 to compute the frequency array data, and deletes the oldest 1 frame of data from the 0.75 second data in the second buffer 122, so as to store the new 1 frame of frequency array data in the second buffer 122. In other words, when the processor 122 subsequently computes the power sequence of each degree from the frequency array data of the second buffer 122, for example, the second buffer 122 stores a total of 70 frames of data, of which 69 frames of data are old data, and 1 frame of data is new data. Because the old frequency array data has already been computed for the power sequence of each degree, it is only necessary to use this new 1 frame frequency array data to compute the power sequence of the degree. In this way, the time for computing the power of each degree each time can be reduced. The description of computing the power sequence of each degree from the frequency array data is as follows.

In some embodiments, the microphone array 110 includes a plurality of microphones, and each microphone captures audio data, so that the processor 140 computes the audio data captured by each microphone to obtain the corresponding frequency array data. Therefore, the processor 140 can compute the frequency intensity of the audio data at each frequency of each microphone from the audio data of each microphone. In other embodiments, the microphone array 110 includes a plurality of microphones arranged in a ring shape. For example, the microphones are arranged in a ring shape with a radius of 4.17 cm. For ease of description, the microphone array 110 uses two microphones as an embodiment for description.

In some embodiments, the microphone array 110 includes a first microphone and a second microphone. The first microphone is arranged at a location and a distance that the first microphone is away from the second microphone. In some embodiments, the processor 140 separately computes the first frequency array data of the first microphone and the second frequency array data of the second microphone. The computation procedure of the frequency array data is as described above, and will not be repeated here.

Since the distance which is arranged between the microphones is a known value, and the distance which is arranged between the microphones is quite small. Therefore, for the same sound source, the waveforms of the audio data generated by the microphones will be similar, and there will be a time delay between the waveforms. In some embodiments, the processor 140 may compute the source degree of the sound source relative to the microphone array 110 through the delay or phase degree of the audio data of the first microphone and the audio data of the second microphone. For example, the processor 140 computes the time extension between the first audio data of the first microphone and the second audio data of the second microphone. The time of the first audio data and the second audio data is corrected according to the time extension, so as to align the waveforms of the first audio data and the second audio data. Then, the processor 140 uses the first audio data and the second audio data of the aligned waveforms to obtain the first frequency array data and the second frequency array data. It is worth mentioning that the delay superposition technique can be implemented in the time domain or frequency, and the present disclosure is not limited to this embodiment.

In some embodiments, the processor 140 computes the power sequence of degrees according to the frequency intensity at each frequency of the first frequency array data of the first microphone and the frequency intensity of the second frequency array data at each frequency of the second microphone. The power sequence of degrees includes the sound power of each degree on the plane. For example, the processor 140 uses the first frequency array and the second frequency array to compute the delayed superimposed frequency from 0° to 360°. The processor 140 computes the square sum of the frequency intensity of the first frequency array data at each frequency and the frequency intensity of the second frequency array data at each frequency to obtain the power sequence of degrees. In some embodiments, the processor 140 may compute its angular power every 1° degree, and may also compute the power within an angular range every 10° degree (for example, 0° degree to 9° degree), and the present disclosure is not limited to this embodiment. In this way, the power distribution of each degree or range of degrees from 0° to 360° on the plane can be computed, for example, the maximum power is 40° degree, and the minimum power is 271° degree.

It is worth mentioning that in the conventional technology, after the fast Fourier transform is performed to compute the frequency data (such as the SRP-PHAT algorithm), it is necessary to perform the Inverse Fast Fourier Transform (IFFT) operation to convert the frequency data back to the time domain data to obtain the time curve. Then, the area of the time curve needs to be computed to obtain the power value, which is configured as the degree power data. However, the area computed from the frequency curve, that is, the power value, will not change after the frequency domain is converted to the time domain, therefore in the embodiment, after the fast Fourier transform (FFT) is performed to compute the frequency data, there is no need to perform the inverse Fourier transform (IFFT) operation, instead, directly use the frequency data obtained by the Fast Fourier Transform (FFT) to compute the power value of the degree, and then the degree power sequence (the power value corresponding to each degree or degree range) can be obtained. In this way, the time for performing the inverse Fourier transform (IFFT) operation can be saved, and the computation cost and time can be greatly reduced.

In some embodiments, the processor 140 determines whether the difference between the maximum value and the minimum value of the power sequence of degrees is greater than the threshold value. When the difference is greater than the threshold, it is determined that the degree corresponding to the maximum value is relative to the source degree of the microphone array. When the difference is not greater than the threshold value, the audio data corresponding to the maximum value is determined to be noise data. For example, if the difference between the maximum power (at a degree of 40°) and the minimum power (at a degree of 271°) is greater than the threshold value, it means that the sound source is meaningful. For example, if someone is speaking, the degree (40° degree) is output to, for example, a display device (not shown in FIG. 1). On the other hand, if the difference between the power of the maximum value (at an degree of 40°) and the power of the minimum value (at an degree of 271°) is not greater than the threshold, it means that there is interference or noise in the environment, and the maximum value is only louder noise. Therefore, the degree corresponding to the maximum value is not configured as the source degree of the sound source.

In some embodiments, the processor 140 adopts fixed point arithmetic to process the fast Fourier transform operation, and accelerates the processing of audio data by hardware supporting the computation method of converting floating-point numbers to fixed-point numbers.

Figure 2:
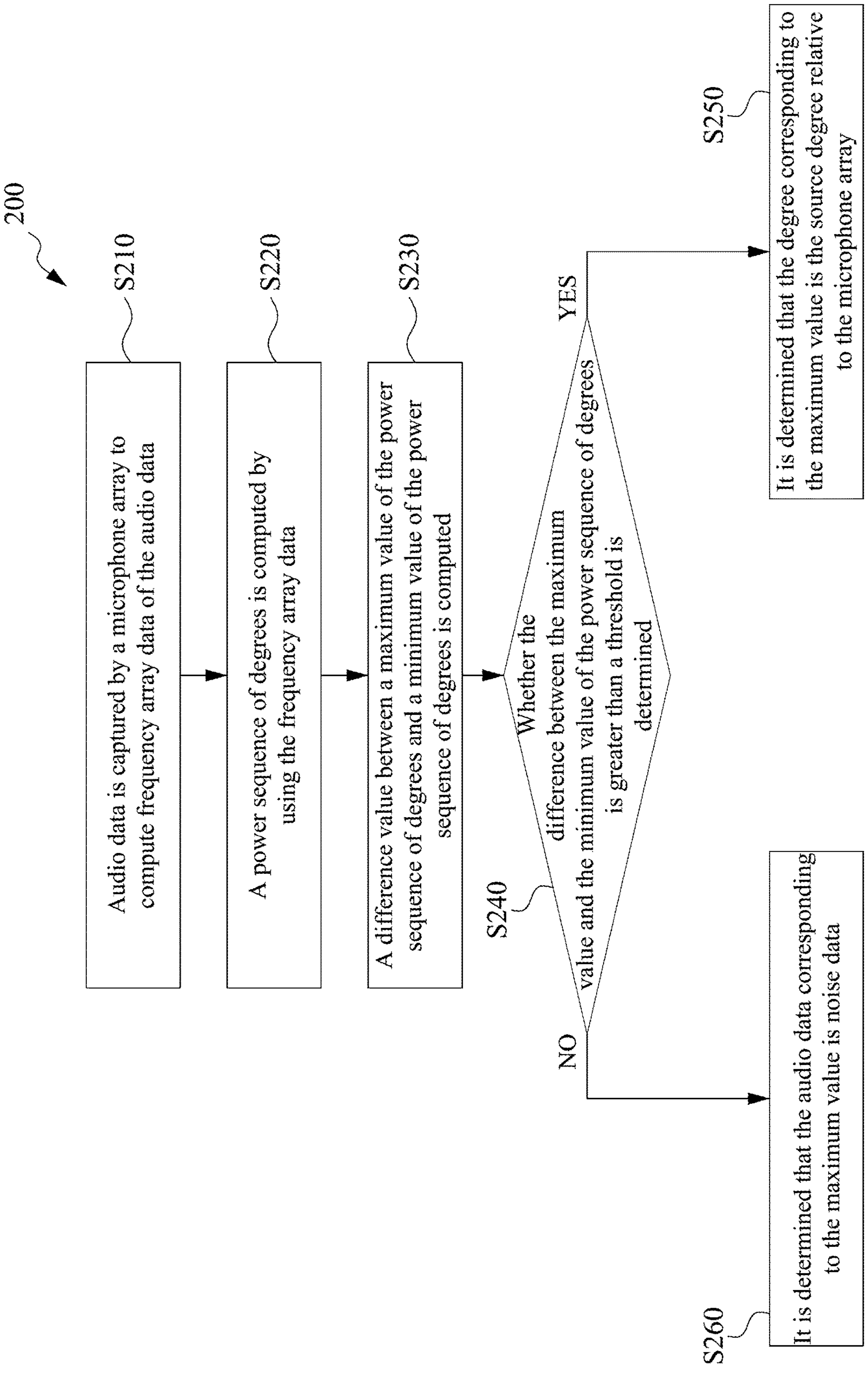
FIG. 2 shows a flow chart of an audio processing method according to some embodiments of this invention.

Please refer to FIG. 1 and FIG. 2 for the following description. FIG. 2 shows a flow chart of an audio processing method 200 according to some embodiments of this invention. The audio processing method 200 can be executed by at least one element in the conference room system 100.

In step S210, audio data is captured by a microphone array 110 to compute frequency array data of the audio data.

In some embodiments, the audio data captured by the microphone array 110 is stored in the first buffer 121 at a sampling rate of, for example, 48 kHz. The first buffer 121 is, for example, a temporary storage space that can store audio signals for 2 seconds. When the microphone array 110 continuously captures audio signals, the audio signals are stored in the first buffer 121 in a first-in first-out order. If one frame of audio data includes 1024 sample data, the first buffer 121 stores a plurality of frames for subsequent computation of the fast Fourier transform.

In step S220, a power sequence of degrees is computed by using the frequency array data.

In some embodiments, the processor 140 reads a data number (for example, 1 frame) of audio data from the first buffer 121 as the input of the fast Fourier transform operation. In some embodiments, the processor 140 computes the frequency array data based on a Fourier length and a window shift among this 1 frame of audio data. The Fourier length can be 1 frame (for example, 1024 samples) of audio data, and the window shift can be 512 samples of data. The processor 140 performs a fast Fourier transform operation on the audio data of each frame to obtain the frequency array data of each frame. The frequency array data is stored in the second buffer 122 in a first-in first-out order. The storage space of the second buffer 122 is, for example, a temporary storage space that can store 0.75 seconds of audio data. Therefore, when each time the processor 140 computes a new frame of frequency array data, it will first delete the oldest frame of data in the second buffer 122, so that the new 1 frame frequency array data is stored in the last storage space in the second buffer 122 in the order of first-in and new-out.

In step S230, a difference value between a maximum value of the power sequence of degrees and a minimum value of the power sequence of degrees is computed.

In some embodiments, the microphone array 110 includes a plurality of microphones. The processor 140 reads the audio data generated by these microphones, and computes the frequency array data of the audio data respectively. For example, the processor 140 computes the first frequency array data of the first microphone and the second frequency array data of the second microphone respectively. The computation procedure of the frequency array data is as described above, and will not be repeated here.

In some embodiments, the processor 140 may compute the source degree of the sound source relative to the microphone array 110 through the delay or phase degree of the audio data of the first microphone and the audio data of the second microphone. In addition, the processor 140 computes the power sequence of degrees according to the frequency intensity of the first frequency array data at each frequency of the first microphone and the frequency intensity of the second frequency array data at each frequency of the second microphone. The power sequence of degrees includes the sound power of each degree on the plane. In this way, every time 1 frame of frequency array data is generated, the sound power of each degree can be updated. In some embodiments, the processor 140 may obtain the maximum value and the minimum value from the sound power at a degree of 0° to a degree of 360°.

In step S240, whether the difference between the maximum value and the minimum value of the power sequence of degrees is greater than a threshold is determined. In some embodiments, when the processor 140 determines that the difference between the maximum value and the minimum value of the power sequence of degrees is greater than the threshold value, step S250 is executed. In step S250, when the difference value is greater than the threshold value, it is determined that the degree corresponding to the maximum value is the source degree relative to the microphone array. If it is determined in step S240 that the difference is not greater than the threshold value, step S260 is executed. In step S260, it is determined that the audio data corresponding to the maximum value is noise data.

In some embodiments, since the audio processing method 200 obtains the source degree of the sound source in real time, the processor 140 will further output the source degree. For example, the sound source will be output to a display device (not shown in FIG. 1) with the source degree for viewing by related person, or another camera is controlled according to the source degree to be rotated to the source degree to take pictures of the sound source or make related close-up.

In some embodiments, the processor 140 may be implemented as, but not limited to, a central processing unit (CPU), a system on chip (System on Chip, SoC), an application processor, an audio processor, a digital signal processor (digital signal processor, DSP) or specific function processing chip or controller.

In some embodiments, a non-transitory computer-readable recording medium is provided, which can store multiple program codes. After the program code is loaded into the processor 140 as shown in FIG. 1, the processor 140 executes the program code and executes the steps as shown in FIG. 2. For example, the processor 140 uses the audio data obtained by the microphone array 110 to compute the frequency array data of the audio data, uses the frequency array data to compute the power sequence of degrees, and compute the difference between the maximum value and the minimum value of the power sequence of degrees to determine whether the degree corresponding to the maximum value is the source degree relative to the microphone array 110.

In summary, the conference room system and audio processing method of the present disclosure have the following advantages: a look-up table is set up to record the degree value and its corresponding sine value, the computation time of the processor 140 to compute each Fourier transform is saved (effectively reduced), and the recording procedure and the degree computation procedure can be performed separately by setting the first buffer 121. In addition, the conference room system is equipped with hardware that supports fixed-point computing, which can greatly speed up computing time. Moreover, after obtaining the frequency array data, the present disclosure does not need to perform the inverse Fourier transform operation to convert into time domain data, but directly computes the frequency data to compute the power of the sound source so as to shorten the time for computing the power of the sound source. Furthermore, the 0.75 second frequency array is stored in the second buffer 122. Therefore, when every time a new frame of data is computed, it only needs to delete the oldest 1 frame of data in the frequency data of the second buffer 122 and add a new 1 frame of data, so that the power value of each degree can be updated. Compared with the method that generally takes 2 seconds to recompute each degree, the present disclosure can instantly obtain the source degree of the current sound source.

In addition, the conference room system and audio processing method of the present disclosure determine whether the current maximum sound source is noise by computing the difference between the maximum value and the minimum value each time, so as to avoid the interference of the judgment of the sound source by noise, and then improve the stability and accuracy of the system.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An audio processing method, comprising:

capturing audio data by a microphone array and storing a plurality of frames of the audio data in a first buffer according to a sampling rate, wherein the microphone array comprises a first microphone and a second microphone, the first microphone is arranged at a location and a distance that the first microphone is away from the second microphone, and the audio data comprises first audio data generated by the first microphone and second audio data generated by the second microphone;

performing following operations by a processor electrically coupled to the microphone array, the first buffer, and a second buffer:

reading a number of the first audio data generated by the first microphone and the second audio data generated by the second microphone from the first buffer and using the first audio data and the second audio data of aligned waveforms to obtain a first frequency array data and a second frequency array data, wherein a fast Fourier transform operation based on a Fourier length and a window shift is performed to compute the first frequency array data of the first audio data generated by the first microphone and the second frequency array data of the second audio data generated by the second microphone;

reading a newly arrived portion of the plurality of frames of the audio data from the first buffer and performing the fast Fourier transform operation to obtain a first new frame of the first frequency array data and a second new frame of the second frequency array data;

deleting an oldest one frame of the first frequency array data and the second frequency array data in the second buffer, and storing the first new frame of the first frequency array data and the second new frame of the second frequency array data in the second buffer, wherein the second buffer is electrically coupled to the first buffer;

directly using the first new frame of the first frequency array data and the second new frame of the second frequency array data stored in the second buffer to compute power values of degrees when the first new frame of the first frequency array data and the second new frame of the second frequency array data are stored in the second buffer, and updating a power sequence of degrees on a plane relative to the microphone array, wherein the first frequency array data and the second frequency array data are stored in the second buffer in a first-in first-out order, wherein a square sum of a first frequency intensity of the first frequency array data at each frequency corresponding to the first microphone and a second frequency intensity of the second frequency array data at each frequency corresponding to the second microphone is computed to obtain the power sequence of degrees, wherein the power sequence of degrees comprises the power values of degrees from 0° to 360° on the plane relative to the microphone array;

finding a first degree having a maximum power value and a second degree having a minimum power value in the updated power sequence of degrees;

computing a difference value between the maximum power value and the minimum power value; and determining that the first degree having the maximum power value is a source degree of a sound source when the difference value is greater than a threshold value; and obtaining or outputting pictures of the sound source according to the source degree of the sound source.

2. The audio processing method of claim 1, wherein the frequency array data stored in the second buffer comprises a frequency intensity of the audio data at each frequency.

3. The audio processing method of claim 1, wherein the power sequence of degrees comprises a sound power of each degree on the plane.

4. The audio processing method of claim 1, further comprising:

computing a time extension between the first audio data of the first microphone and the second audio data of the second microphone.

5. The audio processing method of claim 4, further comprising:

correcting a time of the first audio data and the second audio data according to the time extension to align waveforms of the first audio data and the second audio data; and configuring the first audio data and the second audio data which is aligned waveforms to obtain the first frequency array data and the second frequency array data.

6. The audio processing method of claim 1, further comprising:

when the difference value is not greater than the threshold value, it is determined that the audio data corresponding to the maximum power value is noise data.

7. The audio processing method of claim 1, further comprising:

outputting the source degree of the sound source relative to the microphone array as a degree of the sound source from which the audio data is generated relative to the microphone array.

8. A conference room system, comprising:

a microphone array configured to capture an audio data;

a first buffer electrically coupled to the microphone array to store a plurality of frames of the audio data according to a sampling rate, wherein the microphone array comprises a first microphone and a second microphone, the first microphone is arranged at a location and a distance that the first microphone is away from the second microphone, and the audio data comprises first audio data generated by the first microphone and second audio data generated by the second microphone;

a processor, electrically coupled to the microphone array and the first buffer; and a second buffer electrically coupled to the first buffer and the processor, wherein the processor is configured to:

read a number of the first audio data generated by the first microphone and the second audio data generated by the second microphone from the first buffer and use the first audio data and the second audio data of aligned waveforms to obtain a first frequency array data and a second frequency array data, wherein a fast Fourier transform operation based on a Fourier length and a window shift is performed to compute the first frequency array data of the first audio data generated by the first microphone and the second frequency array data of the second audio data generated by the second microphone;

read a newly arrived portion of the plurality of frames of the audio data from the first buffer, and perform the fast Fourier transform operation to obtain a first new frame of the first frequency array data and a second new frame of the second frequency array data;

delete an oldest one frame of the first frequency array data and the second frequency array data in the second buffer, and store the first new frame of the first frequency array data and the second new frame of the second frequency array data in the second buffer;

directly use the first new frame of the first frequency array data and the second new frame of the second frequency array data stored in the second buffer to compute power values of degrees when the first new frame of the first frequency array data and the second new frame of the second frequency array data are stored in the second buffer;

update a power sequence of degrees on a plane relative to the microphone array, wherein the first frequency array data and the second frequency array data are stored in the second buffer in a first-in first-out order, wherein a square sum of a first frequency intensity of the first frequency array data at each frequency corresponding to the first microphone and a second frequency intensity of the second frequency array data at each frequency corresponding to the second microphone is computed to obtain the power sequence of degrees, wherein the power sequence of degrees comprises the power values of degrees from 0° to 360° on the plane relative to the microphone array;

find a first degree having a maximum power value and a second degree having a minimum power value in the updated power sequence of degrees;

compute a difference value between the maximum power value and the minimum power value;

determine that the first degree having the maximum power value is a source degree of a sound source when the difference value is greater than a threshold value, and obtain or output pictures of the sound source according to the source degree of the sound source; and determine that the audio data corresponding to the maximum power value is noise data when the difference value is not greater than the threshold value.

9. The conference room system of claim 8, wherein the frequency array data stored in the second buffer comprises a frequency intensity of the audio data at each frequency.

10. The conference room system of claim 8, wherein the power sequence of degrees comprises a sound power of each degree on the plane.

11. The conference room system of claim 8, wherein the processor is further configured to:

compute a time extension between the first audio data of the first microphone and the second audio data of the second microphone.

12. The conference room system of claim 11, wherein the processor is further configured to:

correct a time of the first audio data and the second audio data according to the time extension to align waveforms of the first audio data and the second audio data; and configure the first audio data and the second audio data which is aligned waveforms to obtain the first frequency array data and the second frequency array data.

13. The conference room system of claim 8, wherein the processor is further configured to:

output the source degree of the sound source relative to the microphone array as a degree of the sound source from which the audio data is generated relative to the microphone array.

14. A conference room system, comprising:

a microphone array configured to capture an audio data, wherein the microphone array comprises a first microphone and a second microphone, the first microphone is arranged at a location and a distance that the first microphone is away from the second microphone;

a first buffer electrically coupled to the microphone array to store a plurality of frames of the audio data according to a sampling rate, and the audio data comprises first audio data generated by the first microphone and second audio data generated by the second microphone;

a processor, electrically coupled to the microphone array and the first buffer; and a second buffer electrically coupled to the first buffer and the processor, wherein the processor is configured to:

read a number of the first audio data generated by the first microphone and the second audio data generated by the second microphone from the first buffer and use the first audio data and the second audio data of aligned waveforms to obtain a first frequency array data and a second frequency array data, wherein a fast Fourier transform operation based on a Fourier length and a window shift is performed to compute the first frequency array data of the first audio data generated by the first microphone and the second frequency array data of the second audio data generated by the second microphone;

read a newly arrived portion of the plurality of frames of the audio data from the first buffer, and perform the fast Fourier transform operation to obtain a first new frame of the first frequency array data and a second new frame of the second frequency array data;

delete an oldest one frame of the first frequency array data and the second frequency array data in the second buffer, and store the first new frame of the first frequency array data and the second new frame of the second frequency array data in the second buffer;

directly use the first new frame of the first frequency array data and the second new frame of the second frequency array data stored in the second buffer to compute power values of degrees when the first new frame of the first frequency array data and the second new frame of the second frequency array data are stored in the second buffer;

update a power sequence of degrees on a plane relative to the microphone array, wherein the first frequency array data and the second frequency array data are stored in the second buffer in a first-in first-out order, wherein a square sum of a first frequency intensity of the first frequency array data at each frequency corresponding to the first microphone and a second frequency intensity of the second frequency array data at each frequency corresponding to the second microphone is computed to obtain the power sequence of degrees, wherein the power sequence of degrees comprises the power values of degrees from 0° to 360° on the plane relative to the microphone array;

find a first degree having a maximum power value and a second degree having a minimum power value in the updated power sequence of degrees;

compute a difference value between the maximum power value and the minimum power value; and determine that the first degree having the maximum power value is a source degree of a sound source when the difference value is greater than a threshold value, and obtain or output pictures of the sound source according to the source degree of the sound source, wherein the threshold value corresponds to a power value difference, and if the difference value is greater than the threshold value, it means that the sound source is meaningful.

* * * * *